UNITED STATES PATENT OFFICE.

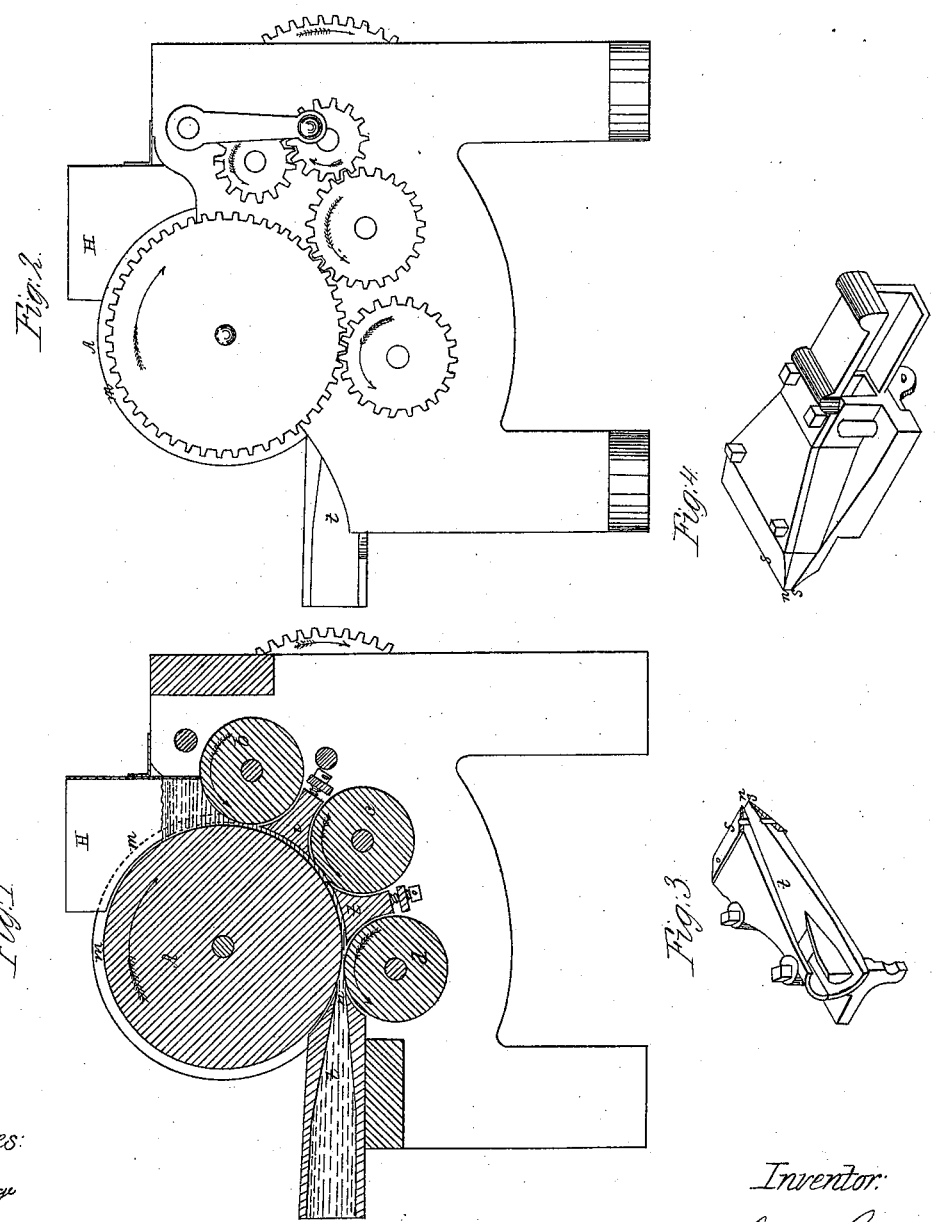

SILAS C. SALISBURY, OF NEW YORK, N. Y.

MACHINE FOR TEMPERING AND MOLDING PLASTIC MATERIALS.

Specification of Letters Patent No. 23,710, dated April 19, 1859.

*To all whom it may concern:*

Be it known that I, SILAS C. SALISBURY, of New York, in the county of New York and State of New York, have invented Improvements in Working, Tempering, Pressing, and Molding Clay and Plastic Materials, and that the following is a full, clear, and exact description of the principle or character which distinguishes them from all other things before known and of the usual manner of making, modifying, and using the same, reference being had to the accompanying drawings, of which—

Figure 1 is a vertical longitudinal middle section of the machine; Fig. 2, a side elevation of the same; Fig. 3, a perspective view of a pipe die with one side removed, and Fig. 4 a perspective view of the die for molding bricks.

My invention consists in certain improvements in machinery for which Letters Patent were granted to me July 27, 1858, for working, tempering, and molding clay and plastic materials described and represented as follows.

Hitherto in the manufacture of various articles from plastic material such as clay it has been found necessary to prepare and temper the clay for the molding operation in what is called the pug mill. By my improved machinery, the pug mill is dispensed with entirely and the clay or other plastic material is thoroughly worked and tempered in its passage through the machine, the parts of which are as follows:

A, $b$, $c$, $d$, are metallic cylinders or rollers mounted to revolve upon bearings in suitable frame work B. These cylinders receive their motion from any required source of power through the driving wheel $e$. The smaller cylinders are arranged around the periphery of the larger and have their peripheries very near to each other and at such distance from the large cylinder as may be determined by the amount of plastic material that is required to pass between them, and at the same time sufficiently near to produce the required operation of tempering the mass. In making bricks for instance the distance may vary from one eighth to one half an inch, and the cylinder $b$ is placed nearer to the cylinder A than the cylinders $c$, $d$. The surface of cylinder $b$ moves at a greater velocity than the surface of the large cylinder A and the surfaces of $c$, $d$ move at the same velocity with the surface of cylinder A. Between the cylinders $b$, $c$, $d$, are strong guard blocks $i$ $i$ or segments extending the length of the cylinders and fixed to the frame of the machine. These segments have their inner faces curved to correspond to the curvature of cylinder A and their lateral faces curved to fit the curvature of the cylinders $b$, $c$, $d$, and their inner faces are so adjusted as to bring their angular edges close to the surfaces of rollers $b$, $c$, $d$. The inner faces of the blocks are a little below the summits of the cylinders $b$, $c$, $d$ thereby forming enlargements at these points of the channel for the plastic material. Upon the ends of cylinder A is a flange $m$, $m$ which projects over and covers the ends of the segments and cylinders so that between the small and large cylinders and the surfaces of the segments and the flanges $m$, on the ends of cylinder A, there is formed a close channel through which the plastic material is worked, tempered, and pressed on its way to the die throat $n$. This die throat is formed of two cutting edges $s$, $s$, extending the length of the cylinder $d$ and over that portion of the length of cylinder A lying between the flanges $m$, $m$. The distance between these cutting edges is greater than the width of the channel so as to make a little expansion of the channel in front of the die throat. The plastic material is intercepted by these cutting-edges and passes between them into the die passage $t$ on its way to the die proper or the forming die which may be of any required character.

Fig. 3 exhibits the die for forming pipe for drainage sewerage or service pipe and Fig. 4 a die for forming bricks.

Whatever may be the article to be formed it is delivered from the machine in a continuous body and may be cut into the various lengths required by the passage of a knife over the open end of the die or at some point behind it after the manner explained in my patent of July 27th 1858 aforesaid or by a knife in the hands of the attendant or by automatic machinery hereafter to be made the subject of an application for Letters Patent.

The hopper H for receiving the plastic material is set over cylinder $b$ and against cylinder A and has the edges of two of its sides near to the periphery of cylinder A and within the flanges $m$, $m$.

The operation of the machine is as follows: The plastic material is carried from the hopper into and through the channel by the action of the cylinders revolving in the direction indicated by the arrows. The cylinder *b* is made to revolve at such a rate that its periphery shall move with greater velocity than the periphery of cylinder A, the effect of which is to prevent stones or hard masses from jamming between the cylinders and also to produce a rubbing and mixing action upon the plastic material. As the material comes to the enlargements of the channel over the guard blocks it is scraped from the smaller cylinders by the edges of the guard blocks and is turned over and over in the enlargements which I call kneading recesses. After the material passes the first roller *b* it begins to adhere in a layer to the large cylinder A while the edges of the guard blocks prevent its adhesion to the smaller rollers and they are constantly pressing it and propelling it on toward the die throat. When it arrives at this point it is intercepted by the cutting edges *s, s*, and there cut or scraped from the cylinders A and *d* and forced into the die by the joint action of the cylinders through the pressure of the layer or coat of material which adheres to the surface of the large cylinder A.

What I claim as my invention and improvement in the tempering and pressing of plastic material, is—

1. The employment of a series of two or more cylinders and the intervening guard blocks in combination with a cylinder of larger diameter provided with flanges on its ends, so that the periphery of the larger cylinder with its flanges, and the opposing surfaces of the series of cylinders and guard blocks, shall constitute the walls of a channel in which the plastic material on its passage to the die or mold is worked, tempered, and pressed as set forth.

2. I claim giving to the surface of the cylinder *b* a greater velocity than the surface of the large cylinder A for the purposes set forth.

3. I claim forcing the plastic material into the die between the cutting edges *s, s*, by the pressure of a coat or layer of the plastic material formed on and adhering to the periphery of the large cylinder as set forth.

SILAS C. SALISBURY.

Witnesses:
CHAS. G. PAGE,
WM. H. HARRISON.